United States Patent [19]
Woo

[11] Patent Number: 5,950,340
[45] Date of Patent: Sep. 14, 1999

[54] SIGN BOX

[76] Inventor: Fay Kan-Kyone Woo, 103 Boyden La., Fortuna, Calif. 95540

[21] Appl. No.: 09/241,738

[22] Filed: Feb. 2, 1999

[51] Int. Cl.[6] ........................ G09F 13/04; G09F 13/18; F21V 1/00; F21V 21/00
[52] U.S. Cl. .................. 40/564; 40/570; 40/546; 40/572; 362/235; 362/249; 362/812
[58] Field of Search .................. 40/564, 570, 572, 40/546, 580; 362/31, 249, 235, 800, 812

[56] References Cited

U.S. PATENT DOCUMENTS

| | | | |
|---|---|---|---|
| 646,113 | 3/1900 | Tuchfarber | 40/572 |
| 1,148,341 | 7/1915 | Spencer | 40/570 |
| 1,509,379 | 9/1924 | Sims | 40/572 |
| 1,712,355 | 5/1929 | Price | 40/572 |
| 2,741,693 | 4/1956 | Fasson | 40/580 X |
| 2,994,148 | 8/1961 | Endelson | 40/570 X |
| 4,561,203 | 12/1985 | MacDonald, Jr. et al. | 40/570 |
| 4,587,755 | 5/1986 | Sunshine | 40/546 X |
| 4,791,745 | 12/1988 | Pohn | 40/546 |
| 4,922,384 | 5/1990 | Torrence | 40/546 X |
| 5,607,227 | 3/1997 | Yasumoto et al. | 362/800 X |
| 5,640,792 | 6/1997 | Smith et al. | 40/546 |
| 5,842,297 | 12/1998 | Tung | 40/546 |
| 5,844,720 | 12/1998 | Ohara et al. | 362/31 X |
| 5,882,105 | 3/1999 | Barlow | 362/249 X |
| 5,887,968 | 3/1999 | Logan | 40/546 X |

FOREIGN PATENT DOCUMENTS 2239941  7/1991  United Kingdom ............ 40/570

*Primary Examiner*—Terry Lee Melius
*Assistant Examiner*—Marcus Dolce
*Attorney, Agent, or Firm*—Rosenberg, Klein & Bilker

[57] ABSTRACT

A sign box includes a light permeable box body of V-shaped cross section, a locating block securely fastened to one side of the flat box body, a circuit board securely mounted on the locating block, the circuit board having a plurality of LEDs (light emitting diodes) respectively inserted into respective through holes at the locating block, a control circuit mounted on the circuit board to control the operation of the LEDs, a cover covered on the control circuit, the circuit board and the locating block, and a mounting frame securely mounted on the cover for securing the sign box to a support.

4 Claims, 6 Drawing Sheets

SIGN BOX

BACKGROUND OF THE INVENTION

Then present invention relates to a sign box, and more particularly to such a sign box which uses LEDs (light emitting diodes) as a light source.

Regular sign boxes are commonly comprised of a light permeable body printed with signs, and a light source installed in the box body for illumination. The light source is comprised of neon lamps or fluorescent lamps. These conventional sign boxes consume much energy, and are not durable in use.

SUMMARY OF THE INVENTION

It is one object of the present invention to provide a sign box which saves power consumption. It is another object of the present invention to provide a sign box which is durable in use. It is still another object of the present invention to provide a sign box which produces an attractive lighting effect. To achieve these and other objects of the present invention, there is provided a sign box comprised of a light permeable box body of V-shaped cross section, a locating block securely fastened to one side of the flat box body, a circuit board securely mounted on the locating block, the circuit board having a plurality of LEDs (light emitting diodes) respectively inserted into respective through holes at the locating block, a control circuit mounted on the circuit board to control the operation of the LEDs, a cover covered on the control circuit, the circuit board and the locating block, and a mounting frame securely mounted on the cover for securing the sign box to a support. When different colors of LEDs are used and controlled to emit light subject to a predetermined sequence, a fantastic lighting effect is achieved.

DETAILED DESCRIPTION OF THE PREFERRED EMBODIMENT

Figure 1:
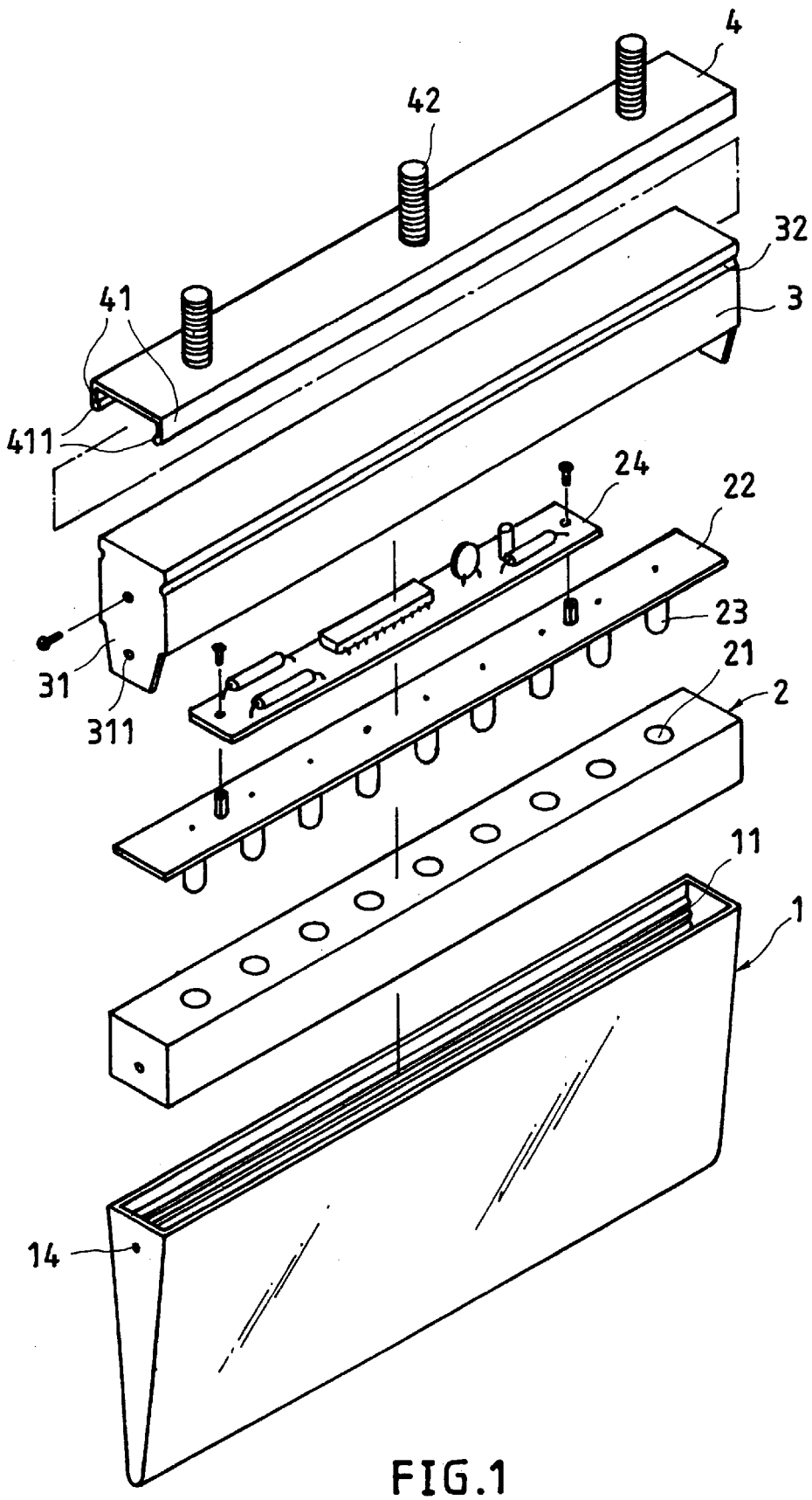
FIG. 1 is an exploded view of a sign box according to the present invention.
Figure 2:
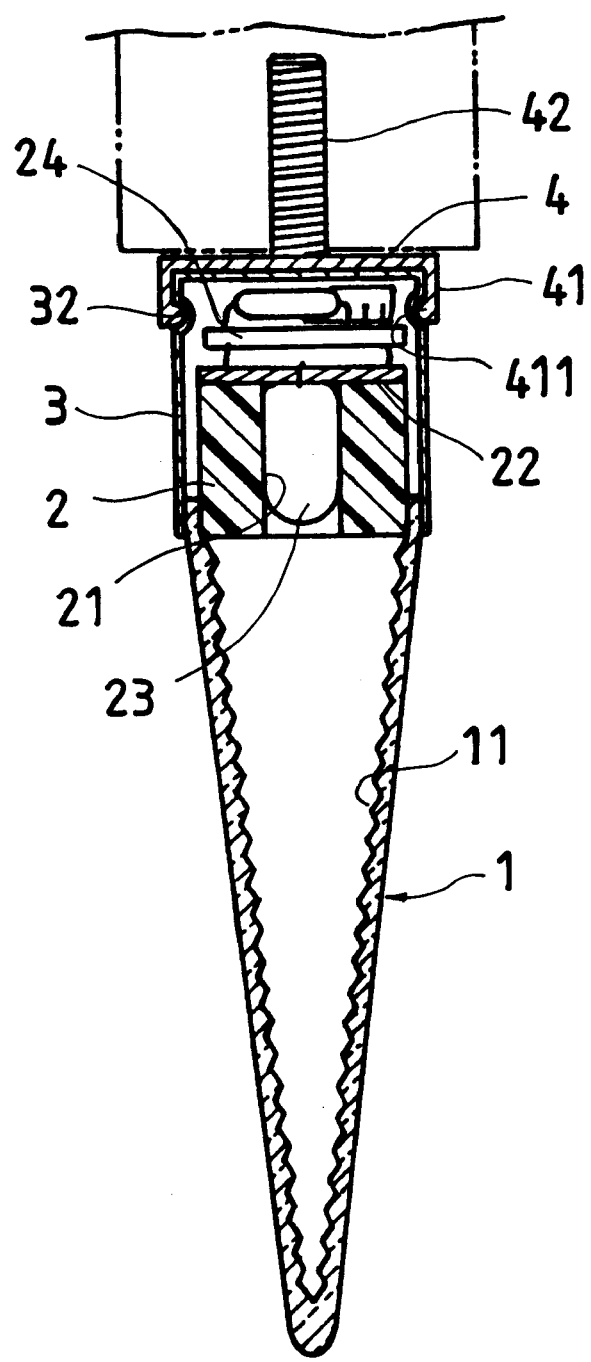
FIG. 2 is a sectional view showing the sign box assembled according to the present invention.

Referring to FIGS. 1 and 2, a sign box in accordance with the present invention is generally comprised of a light permeable flat box body 1, a locating block 2, a circuit board 22, a control circuit 24, a cover 3, and a mounting frame 4. The box body 1 has a substantially V-shaped cross section, and a plurality of refracting surface portions 11 on its inside wall. The locating block 2 is securely fastened to one side of the flat box body 1, having a plurality of through holes 21 longitudinally arranged in a line and respectively disposed in communication with the inside space of the box body 1. The circuit board 22 is securely mounted on the locating block 2, having a plurality of LEDs (light emitting diodes) 23 respectively inserted into the through holes 21 at the locating block 2. The control circuit 24 is mounted on the circuit board 22, and connected to the circuit in the circuit board 22 to control the lighting mode and length of lighting time of the LEDs 23. The cover 3 is securely fastened to the box body 1, and covered on the control circuit 24, the circuit board 22 and the locating block 2. The cover 3 comprises two coupling grooves 32 longitudinally disposed on two opposite lateral sides thereof, and two mounting flanges 31 at two opposite ends thereof. The mounting flanges 31 have mounting holes 311 respectively fastened to respective mounting holes 14 at the box body 1 by fastening elements. The mounting frame 4 comprises two inward coupling flanges 411 respectively raised from two opposite lateral side walls 41 thereof and respectively coupled to the coupling grooves 32 at the cover 3, and a plurality of screw rods 42 for securing to a support on the wall of a building.

Figure 3:
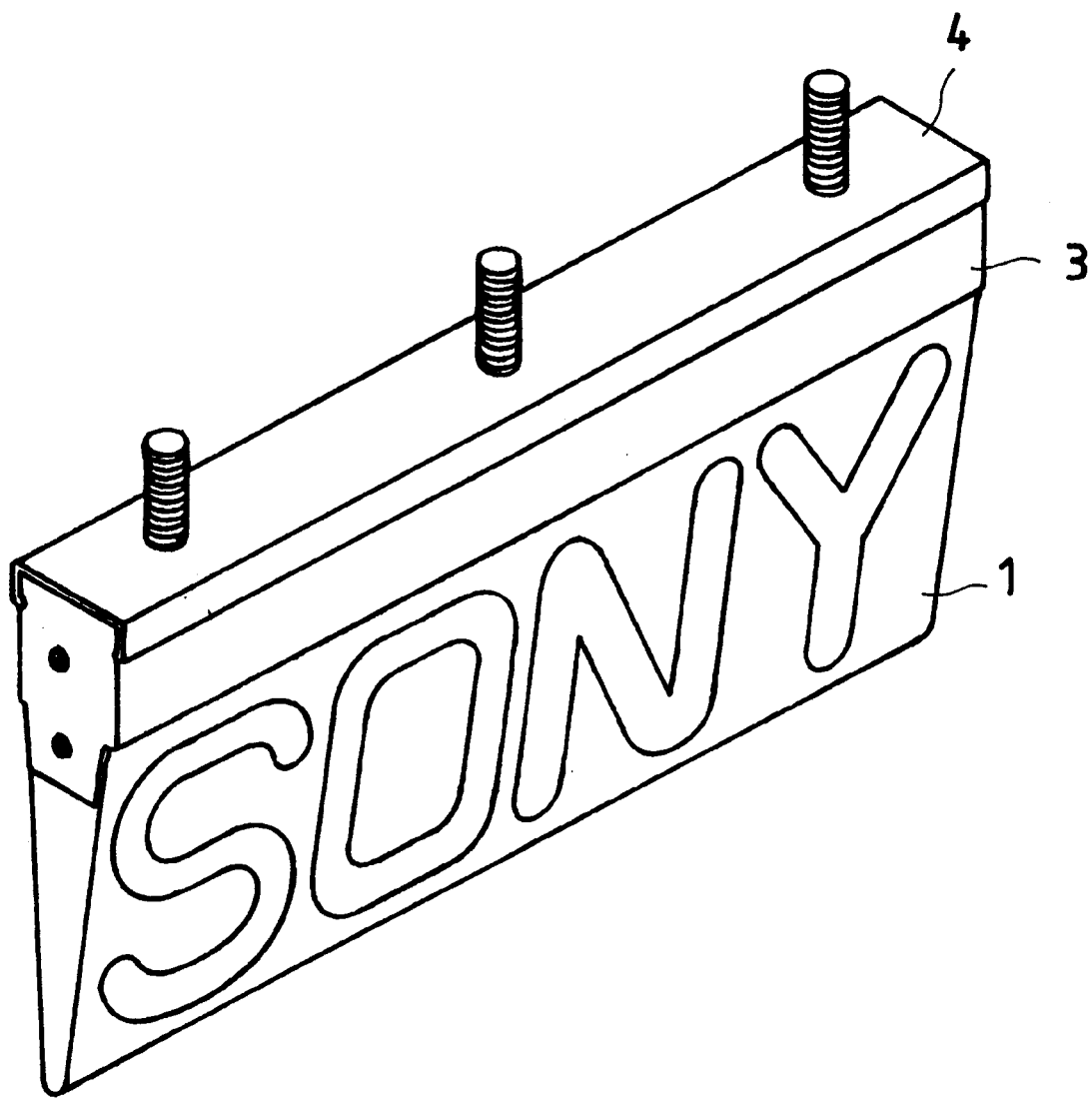
FIG. 3 illustrates the box body of the sign box printed with a commercial mark according to the present invention.
Figure 4:
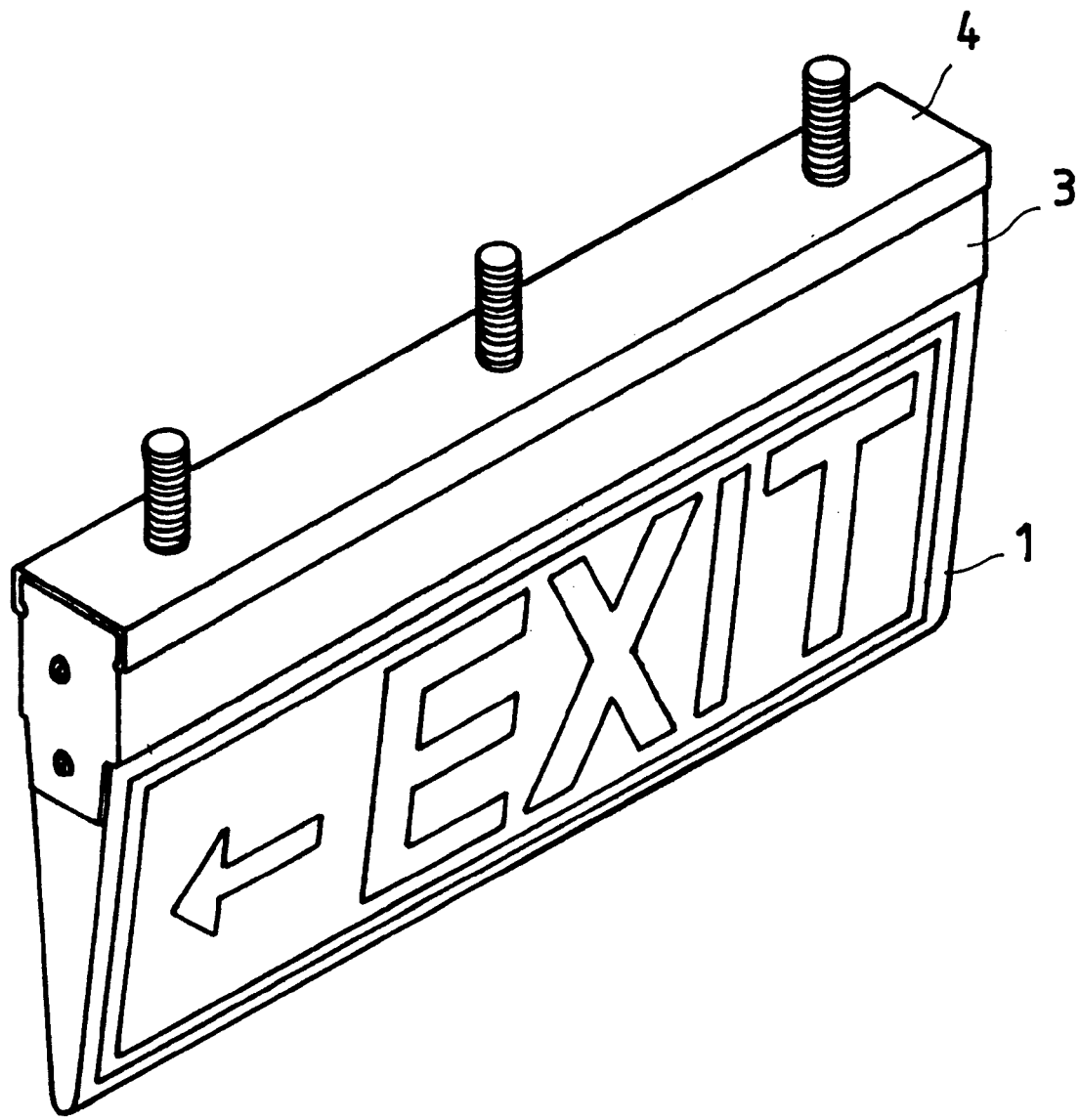
FIG. 4 illustrates the box body of the sign box printed with a sign according to the present invention.

Referring to FIGS. 3 and 4 and FIGS. 1 and 2 again, the outside wall of the box body 1 may be printed with a logo or commercial mark (see FIG. 3), or a sign (see FIG. 4). When the LEDs 23 are turned on, light is refracted in different directions to illuminate the box body 1. Because LEDs are used as light source means, the sign box is power saving, and durable in use.

Figure 5:
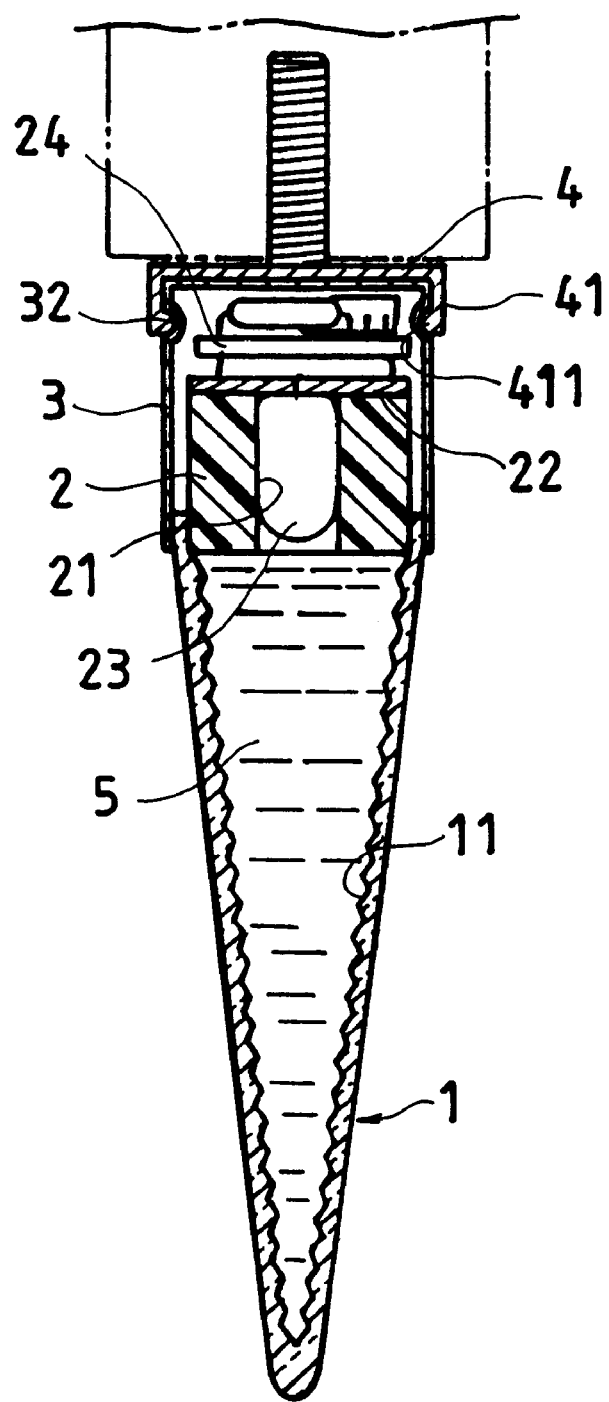
FIG. 5 is a sectional view of the present invention, showing the sign box filled up with a liquid.

Referring to FIG. 5, the box body 1 may be filled up with a liquid 5 that deflects light. When the LEDs 23 are turned on, light is deflected through the liquid 5 in all directions, and therefore the box body 1 is well illuminated.

Figure 6:
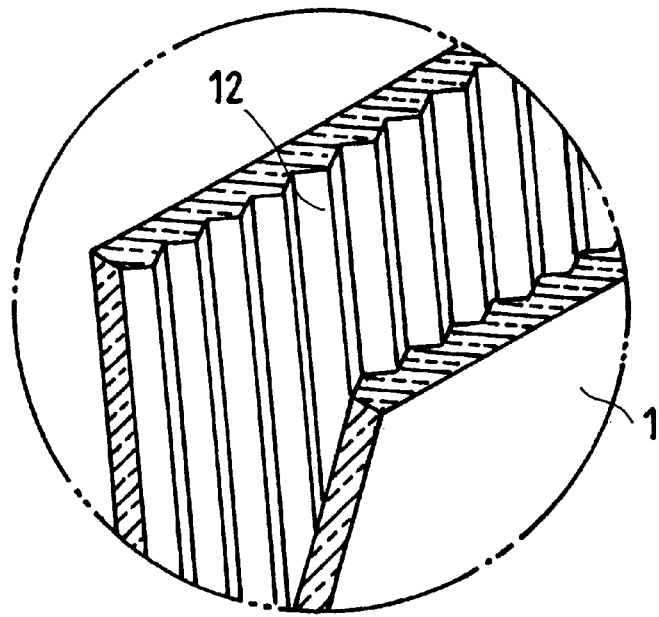
FIG. 6 is a sectional view of a part of the present invention, showing refracting prisms formed integral with the inside wall of the box body.
Figure 7:
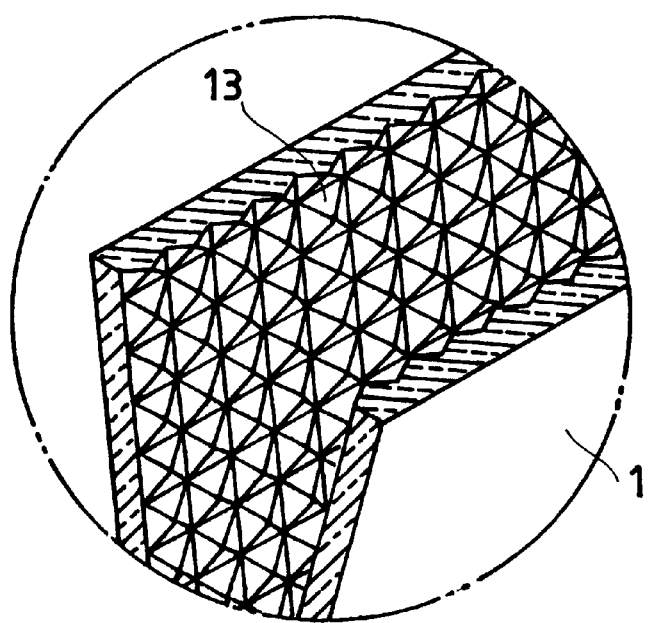
FIG. 7 is a sectional view of a part of the present invention, showing facets formed integral with the inside wall of the box body.

Referring to FIGS. 6 and 7, elongated refracting prisms 12 (see FIG. 6), or refracting facets 13 (see FIG. 7) may be formed integral with the inside wall of the box body 1.

It is to be understood that the drawings are designed for purposes of illustration only, and are not intended as a definition of the limits and scope of the invention disclosed.

What the invention claimed is:

1. A sign box comprising:

a light permeable box body, said box body having a substantially V-shaped cross section;

a locating block securely fastened to one side of said box body, said locating block having a plurality of through holes longitudinally arranged in a line and respectively disposed in communication with an inside space of said box body;

a circuit board securely mounted on said locating block, said circuit board having a plurality of LEDs (light emitting diodes) respectively inserted into the through holes at said locating block;

a control circuit mounted on said circuit board to control said LEDs;

a cover securely fastened to said box body and covered on said control circuit, said circuit board and said locating block, said cover comprising two coupling grooves longitudinally disposed on two opposite lateral sides thereof, and two mounting flanges at two opposite ends thereof respectively securely fastened to two opposite side walls of said box body by fastening elements; and a mounting frame securely mounted on said cover for securing the sign box to a support, said mounting frame comprising two inward coupling flanges respectively raised from two opposite lateral side walls thereof and respectively coupled to the two coupling grooves at said cover, and a plurality of screw rods for mounting.

2. The sign box of claim 1 wherein said box body is filled up with a liquid that refracts light.

3. The sign box of claim 1 wherein said box body comprises a plurality of elongated refracting prisms formed integral with an inside wall thereof.

4. The sign box of claim 1 wherein said box body comprises a plurality of refracting facets formed integral with an inside wall thereof.

* * * * *